(No Model.)
J. COMEAUX.
PLOW ATTACHMENT.
No. 295,149. Patented Mar. 18, 1884.
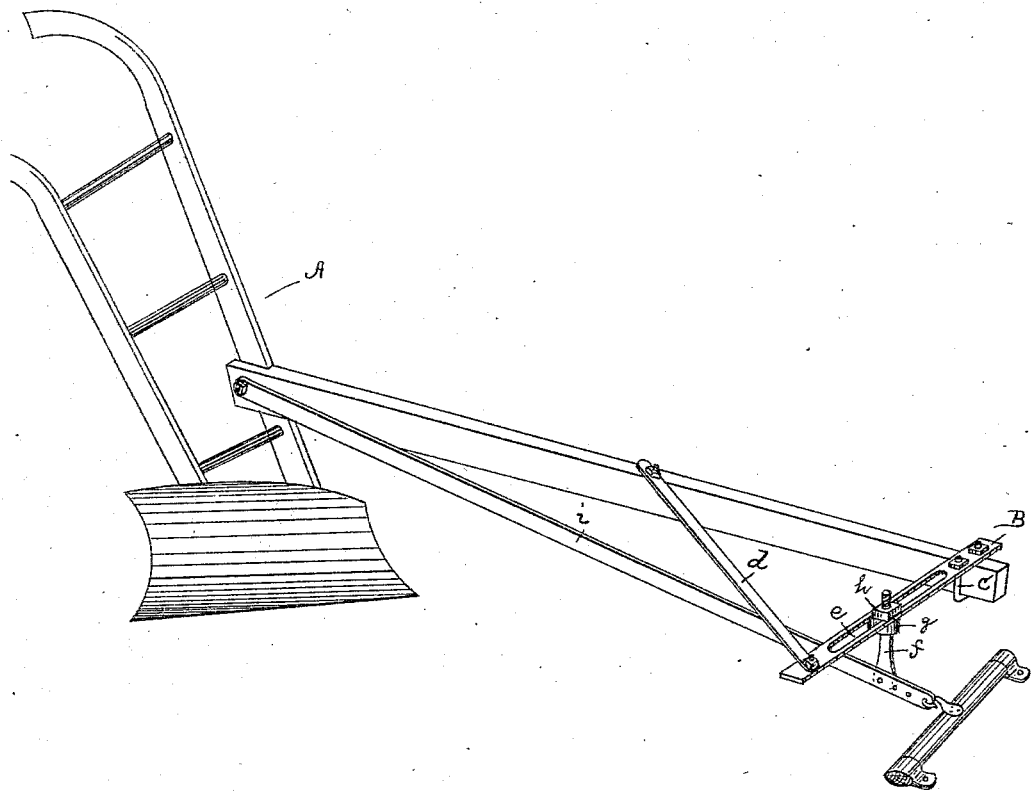
WITNESSES
Alex Mahon
Jno. R. Young.
INVENTOR
Jules Comeaux
By H. N. Jenkins
Attorney

UNITED STATES PATENT OFFICE.

JULES COMEAUX, OF PLAQUEMINE, LOUISIANA.

PLOW ATTACHMENT.

SPECIFICATION forming part of Letters Patent No. 295,149, dated March 18, 1884.

Application filed June 16, 1883. (No model.)

*To all whom it may concern:*

Be it known that I, JULES COMEAUX, a resident of the town of Plaquemine, parish of Iberville, and State of Louisiana, have invented a certain new and useful Improvement in Plow Attachments; and I do hereby declare the following to be a full, clear, and correct description of the same, reference being had to the annexed drawing, making a part of this specification.

This invention relates to a plow attachment; and its object is to provide means whereby the draft-animal shall be made to travel to one side, instead of in a direct line with the plow-beam, as heretofore, thereby enabling the plow to be operated in close proximity to the edge of a ditch without injury to the sides of the same.

The accompanying drawing represents a perspective view of an ordinary plow provided with my invention.

The letter A designates a plow provided with my attachment, which is composed of a bar of metal, B, having a couple of holes at one end thereof, for the reception of the ends of a stirrup, $c$, by means of which it is secured to the forward part of the plow-beam, at or about a right angle thereto. The outer end of the bar B is connected by a brace with the plow-beam, as shown at $d$, and the said bar is provided between the aforesaid brace and fastening-stirrup with a slot, $e$, for the reception of the inner end of a hanger, $f$, which is provided with a shoulder or collar, $g$, and a nut, $h$, whereby it is securely held in any part of the slot. The outer end of the arm $f$ is connected by a draft-rod, $i$, with the rear part of the beam, as shown. This draft-rod $i$ is provided at either end with a series of holes, so that it may be adjusted to the hanger, whether the same be secured in an inward or outward position.

The whiffletree is designed to be connected with the forward part of the device, either to the hanger or to the draft-rod $i$, as shown, so that the draft-animal shall travel to one side of a direct line with the plow-beam.

Having described my invention, what I claim as new, and desire to secure by Letters Patent, is—

In combination with a plow, an attachment consisting of the slotted bar. B, hanger $f$, arranged adjustably on bar B, draft-rod $i$, stirrup $c$, and brace $d$, substantially as and for the purpose specified.

In testimony whereof I affix my signature in presence of two witnesses.

JULES COMEAUX.

Witnesses:
 FELIX ROTH,
 JNO. A. GREAUD.